United States Patent [19]

Bourbeau

[11] Patent Number: 4,897,760
[45] Date of Patent: Jan. 30, 1990

[54] CAPACITOR DISCONNECTION

[75] Inventor: Emile J. Bourbeau, Winslow, Me.

[73] Assignee: Aerovox, Inc., New Bedford, Mass.

[21] Appl. No.: 212,973

[22] Filed: Jun. 29, 1988

[51] Int. Cl.$^4$ .............................................. H02H 7/16
[52] U.S. Cl. .................................................. 361/272
[58] Field of Search ............. 361/15, 272, 275, 306 C, 361/433, 274

[56] References Cited

U.S. PATENT DOCUMENTS

| | | | |
|---|---|---|---|
| 3,246,205 | 4/1966 | Miller | 361/272 |
| 3,248,617 | 4/1966 | Hynes et al. | 361/15 |
| 3,304,473 | 2/1967 | Netherwood et al. | 361/272 |
| 3,377,510 | 4/1968 | Rayno | 361/272 |
| 3,697,824 | 10/1972 | Greskamp | 361/433 H |
| 4,106,068 | 8/1978 | Flanagan | 361/15 |
| 4,107,758 | 8/1978 | Shirn et al. | 361/275 |
| 4,209,815 | 6/1980 | Rollins et al. | 361/15 |
| 4,586,107 | 4/1986 | Price | 361/272 |
| 4,698,725 | 10/1987 | MacDougall et al. | 361/272 |

FOREIGN PATENT DOCUMENTS 1053669  3/1959  Fed. Rep. of Germany.

OTHER PUBLICATIONS

Jeffrey A. Bentley et al., "Capacitor Circuit Interruption", U.S. Ser. No. 870,623, filed Jun. 4, 1986.

Primary Examiner—Donald A. Griffin
Attorney, Agent, or Firm—Fish & Richardson

[57] ABSTRACT

An electrical conductor connected between a capacitor section and a terminal of a capacitor is disconnected with the aid of an actuator having at least two hinged-together sections that move relative to one another in response to distortion of the capacitor's casing.

14 Claims, 3 Drawing Sheets

CAPACITOR DISCONNECTION

BACKGROUND OF THE INVENTION

This invention relates to disconnecting a capacitor section contained in a sealed casing in response to pressure buildup in the casing.

In one disconnection scheme, terminals extending through the sealed cover are connected to the capacitor section by breakable electrical conductors. A flexible plate lies within the casing between the capacitor section and the terminals. Opposite ends of the plate abut the interior walls of the casing to assure that the plate will bow away from the cover when internal pressure collapses the interior walls against the ends of the plate. When the plate bows, the conductors break.

SUMMARY OF THE INVENTION

In a general feature of the invention, an electrical conductor connected between a capacitor section and a terminal of a capacitor is disconnected with the aid of an actuator having at least two hinged-together sections that move relative to one another in response to deformation of the capacitor's casing.

Preferred embodiments of the invention include the following features. The casing includes a can and a cover sealed to the can; a pair of terminals are mounted in the cover projecting into the inside of the casing, with tips of the terminals connected via electrical conductors to the capacitor section; the actuator has a central (rectangular) panel with two flanges hinged to opposite edges of the central panel; and the actuator is positioned between the terminals and the conductor with the flanges positioned to receive forces produced by the deformation of the casing and to translate the forces into motion of the panel away from the cover, aiding disconnection. The central panel has holes (one elongated) to receive the tips of the terminals and the electrical conductors are connected to the tips adjacent the actuator. The panel and the flanges are set at an angle to one another. The flange ends are seated in the corners where the cover is sealed to the can edge.

Disconnection is rapid, and the chance of reconnection is reduced. The actuator plate can be easily molded, die punched, or formed from any material which remains rigid enough to break the weld between the capacitor and the terminals. The plate is easily installed, is self supporting, and cooperates with the bulging cover to provide double-action disconnection. Because the plate is supported at the corners where the cover meets the side walls, the bulging of the cover has minimal effect on the vertical position of the plate. The plate may be used with any shape or style (round, oval, or rectangular) which deforms under internal pressure, and may be used with any number of terminals.

Other advantages and features will become apparent from the following description of the preferred embodiment, and from the claims.

DESCRIPTION OF THE PREFERRED EMBODIMENT

We first briefly describe the drawings.

Structure

Figure 1:
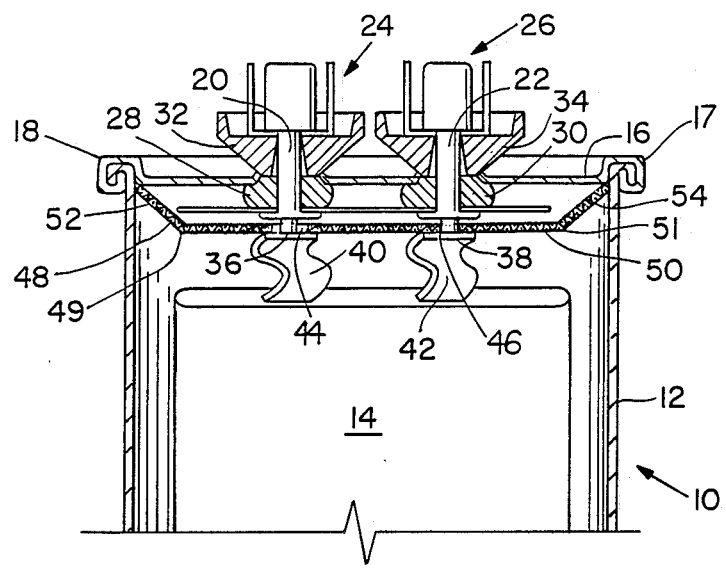
FIG. 1 is a sectional side view of a portion of a sealed casing capacitor.

Referring to FIG. 1, in a capacitor 10, an oval sheet metal can 12 holds a conventional liquid dielectric impregnated capacitor section 14. A sheet metal cover 16 is hermetically sealed to the top of the can along a rim 18 formed by rolling (and thus interlocking) the peripheral edge of the cover 16 and the upper edge 17 of the can wall. Posts 20, 22, of two terminals 24, 26 are riveted to the cover 16 and are insulated from the cover 16 by washers 28, 30 and insulators 32, 34. The tips 36, 38 of posts 20, 22 lie within the can 12 and are electrically connected to the installed, is self supporting, and cooperates with the capacitor section 14 by welding to copper tabs 40, 42.

Figure 2:
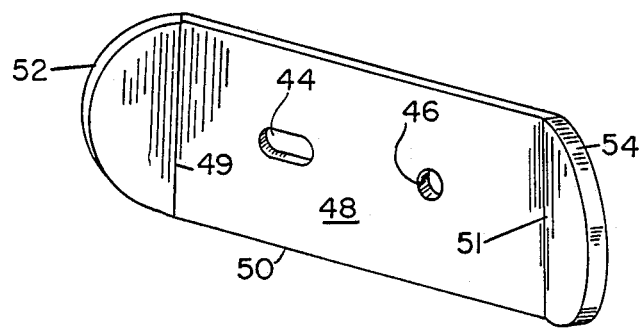
FIG. 2 is a perspective view of the disconnection plate of the capacitor.

Referrinq also to FIG. 2, the tips of terminal posts 36, 38 lie in two clearance holes 44, 46 formed in a vulcanized fiber plate 48. The plate 48 is 0.062"thick, has a hardness of 65 to 75 on the Rockwell T scale after 24 hours post cure at 150° C., and includes a rectangular center panel 50 with flanges 52, 54 at opposite ends. Flanges 52, 54 join panel 50 at two hinge lines 49, 51 with flanges 52, 54 lying at 35 degrees to the plane of panel 50. The outer edges of flanges 52, 54 touch the inner walls of the can 12 and the cover 16 at the corner formed on the inside of rim 18. Plate 48 is supported by tabs 40, 42. Hole 44 is elongated to provide room for movement of tips 36, 38 when bulginq of the cover causes them to be withdrawn from holes 44, 46

Operation

Figure 3:
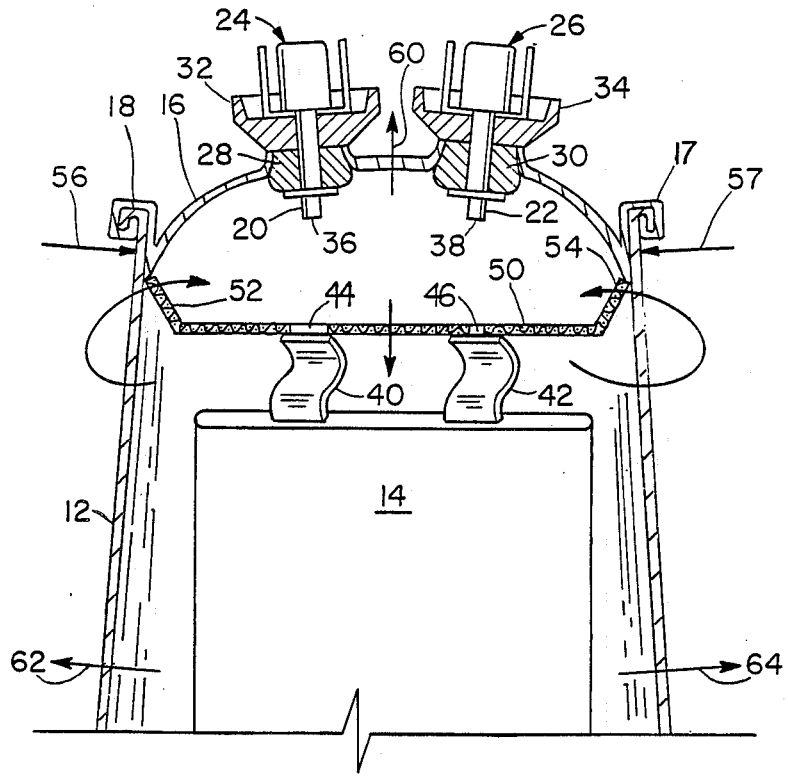
FIG. 3 is a sectional side view of the capacitor after distortion of the casing.
Figure 4A:
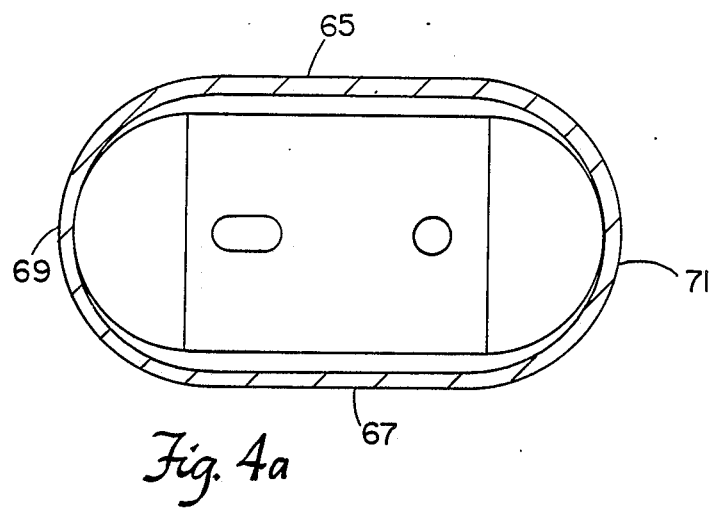
FIGS. 4A, 4B are top views of the disconnection plate in two stages of operation.
Figure 4B:
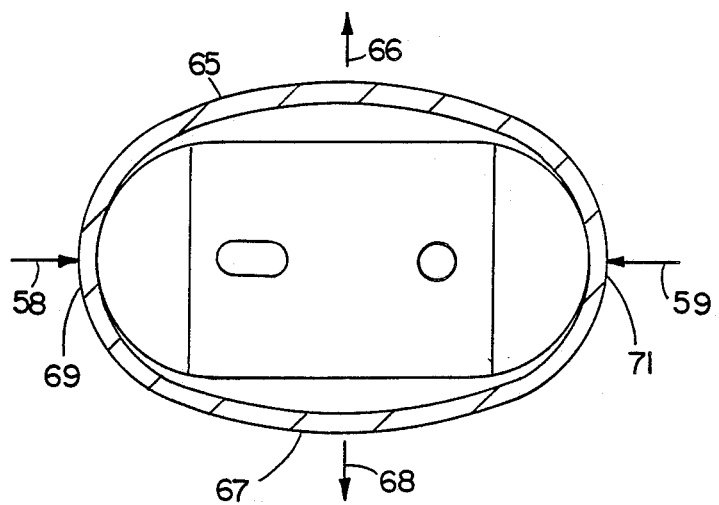

Referring to FIGS. 3, 4, when internal pressure builds up, e.g., due to qas released during thermal runaway or other malfunction, the walls of the casing are deformed. Cover 16, the mid parts of can 12, and the longer sides 65, 67 of rim 18 bulge outward (as suggested by arrows 60, 62, 64, 66, 68) and the ends 69, 71 of rim 18 collapse (as suggested by arrows 56, 57, 58, 59). The collapse of rim 18 causes flanges 52, 54 of plate 48 to bend inward relative to panel 50 about lines 49, 51 (which serve as hinges), forcing the panel 50 (and hence tabs 40, 42) down, away from the cover 16. The terminals 24, 26 are forced up, away from panel 50, as cover 16 bulges. Thus, as internal pressure increases, sufficient tension is applied between the terminals and the tabs to break the welds, disconnecting capacitor section 14, and preventing rupture of the casing. Disconnection is aided by the combination of upward motion of the bulging cover and the downward motion of panel 50. The chance that the tabs may become reconnected to the terminals as the capacitor cools is reduced because panel 50 is held down by flanges 52, 54.

Figure 5:
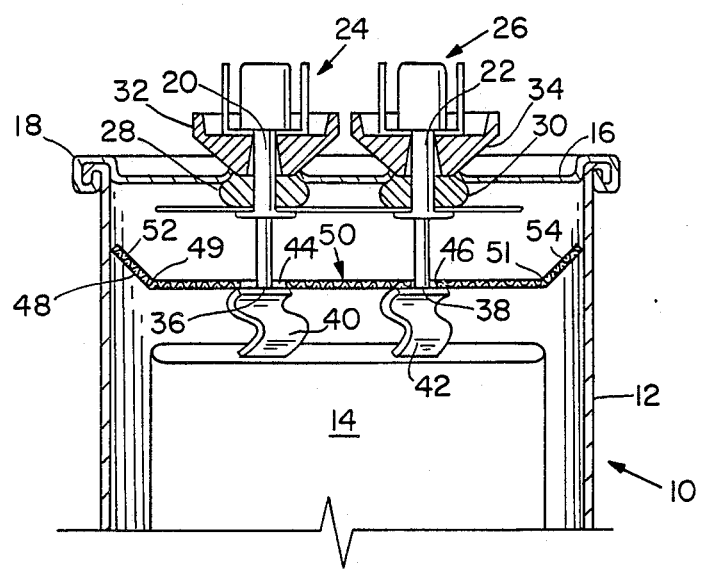
FIG. 5 is a sectional side view of an alternate embodiment.

Other embodiments are within the following claims. For example, referring to FIG. 5, plate 48 may be placed in the can in a lower position where the ends of the flanges touch the inside of the can but not the lid. The plate is then held down by friction.

I claim:

1. A self-disconnecting capacitor comprising:
   a sealed casing containing a capacitor section,
   a terminal extending through said casing, an electrical conductor located within said casing and connected between said capacitor section and said terminal and an actuator located within said casing and having at least two actuator sections connected at a hinge line to permit one section to bend about said hinge line relative to the other section, said actuator being configured and positioned relative to said casing and said conductor so that deformation of said casing causes bending of said one actuator section about said hinge line relative to said other section and said bending aids disconnection of said conductor from said terminal.

2. The capacitor of claim 1 wherein one said actuator section is positioned to be pressed by said casing during said deformation.

3. The capacitor of claim 1 wherein one said actuator section is positioned to be forced away from said terminal during said deformation.

4. The capacitor of claim 1 wherein said actuator includes a third section connected at a second hinge line to one of said two sections, such that said distortion also causes said third section to bend about said second hinge line relative to said one of said two sections.

5. The capacitor of claim 1 wherein said 2 actuator lies between said terminal and said conductor.

6. The capacitor of claim 1 wherein said actuator comprises a panel and a flange connected to said panel at said hinge line.

7. The capacitor of claim 6 wherein said panel and flange are set at an angle to one another prior to said deformation.

8. The capacitor of claim 1 wherein said actuator has a hole for receiving the tip of said terminal and said conductor is connected to said tip adjacent said actuator.

9. The capacitor of claim 8 wherein said hole is elongated.

10. The capacitor of claim 1 wherein said casing comprises a can and a cover sealed along its perimeter to the top edge of the can to form an internal corner in said casing and one of said actuator sections has an end seated in said corner.

11. The capacitor of claim 1 wherein said actuator comprises a rectangular panel with two flanges hinged respectively to opposite edges of said panel.

12. The capacitor of claim 1 comprising a plurality of terminals.

13. A self-disconnecting capacitor comprising:
a casing including a can containing a capacitor section, and a cover sealed to the can,
a pair of terminals mounted in the cover, projecting into the inside of the casing, and having tips connected via electrical conductors to the capacitor section, and
an actuator for aiding disconnection of the electrical conductor, comprising a central panel with two flanges connected at two spaced apart hinge lines to opposite edges of the central panel, said actuator being positioned between said terminals and said conductors with said flanges being positioned to receive forces produced by the deformation of said casing and to translate said forces into motion of said panel way from said cover, aiding disconnection.

14. An actuator for use in self-disconnecting capacitor to aid disconnection of an electrical conductor from a capacitor section within the capacitor comprising
a generally flat panel having an aperture for receiving said conductor,
two flanges connected to said panels, one at each end of said panel, each flange being connected to said panel along a hinge line,
said panel and said two flanges being integrally formed with each said flange disposed at an angle to the plane of said panel.

* * * * *

UNITED STATES PATENT AND TRADEMARK OFFICE
CERTIFICATE OF CORRECTION

PATENT NO. : 4,897,760

DATED : January 30, 1990

INVENTOR(S) : Emile J. Bourbeau

It is certified that error appears in the above-identified patent and that said Letters Patent is hereby corrected as shown below:

In the Specification

| | |
|---|---|
| Col. 2, lines 19-20 | Delete "installed, is self supporting, and cooperates with the". |
| Col. 2, line 22 | "Referrinq" should be --Referring--. |
| Col. 2, line 35 | "bulginq" should be --bulging--. |
| Col. 2, line 40 | "qas" should be --gas--. |

In the Claims

| | |
|---|---|
| Col. 3, line 7 | Delete the comma after "section". |
| Col. 3, line 26 | Delete the number "2". |
| Col. 4, line 26 | "way should be --away--. |
| Col. 4, line 33 | "panels" should be --panel--. |

Signed and Sealed this

Twenty-eighth Day of May, 1991

Attest:

HARRY F. MANBECK, JR.

*Attesting Officer*  *Commissioner of Patents and Trademarks*